July 7, 1931.  J. P. FARNAM ET AL  1,813,730
INTERNAL COMBUSTION ENGINE
Filed March 5, 1929    4 Sheets-Sheet 4
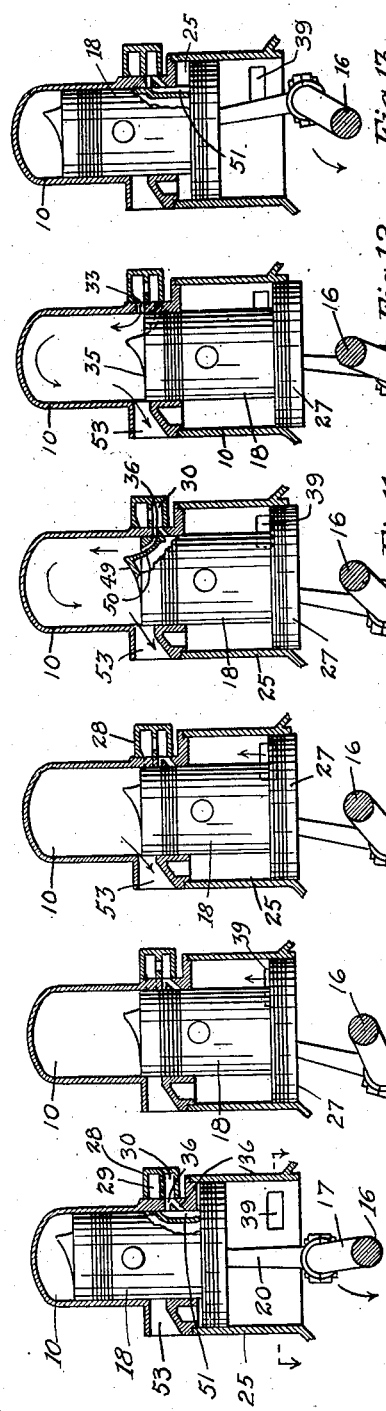
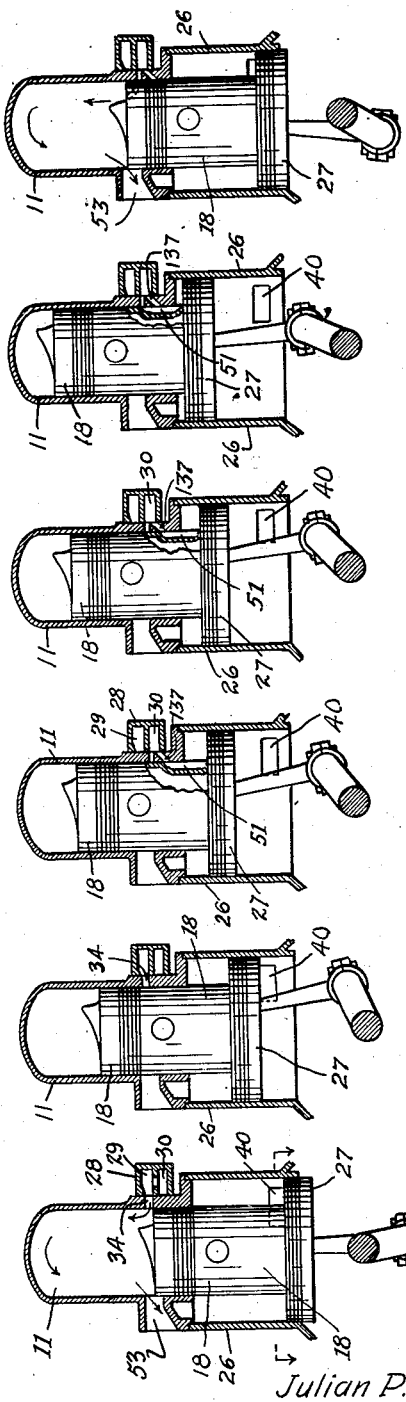
Inventors
Julian P. Farnam
Edward R. Stone
By Caswell & Sagaard
Attorneys Patented July 7, 1931

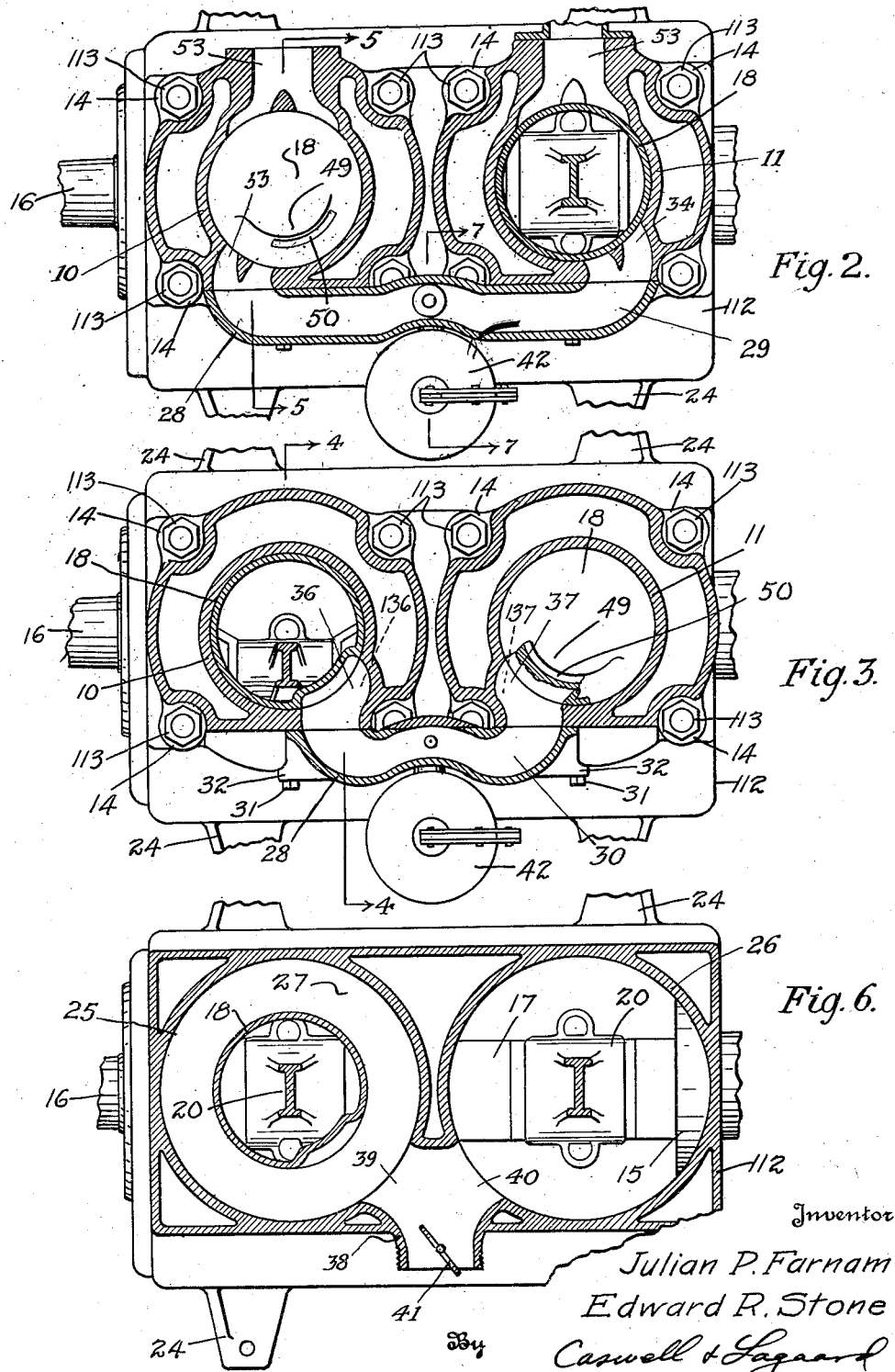

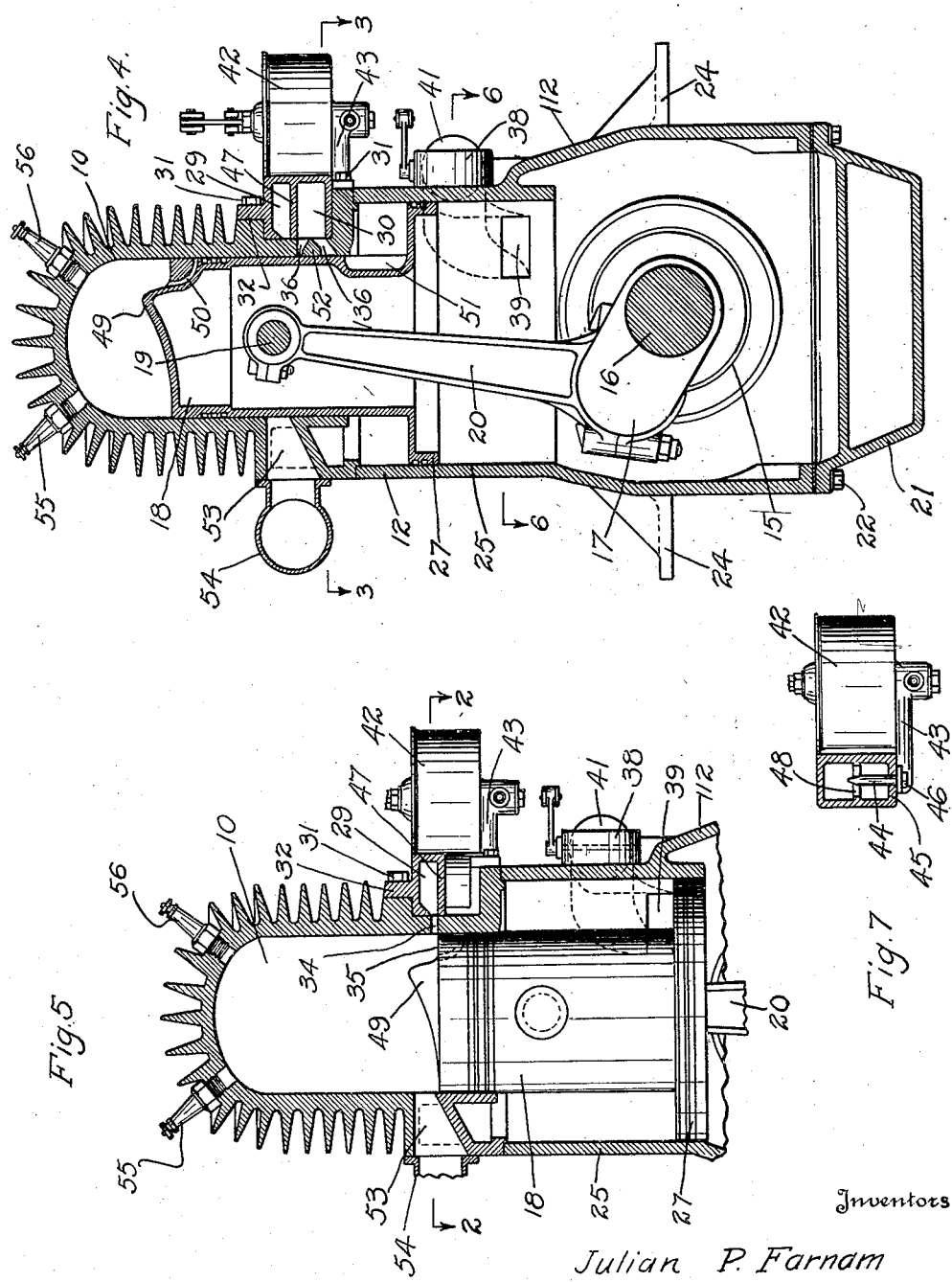

1,813,730

UNITED STATES PATENT OFFICE

JULIAN P. FARNAM AND EDWARD R. STONE, OF MINNEAPOLIS, MINNESOTA

INTERNAL COMBUSTION ENGINE

Application filed March 5, 1929. Serial No. 344,134.

Our invention relates to internal combustion engines and particularly to the two cycle type, and has for its object to provide a device of such character in which the burned gases are exhausted and the cylinder scavenged with fresh air prior to the charge of the cylinder with fuel mixture so as to prevent preignition, overheating, loss of power and other evils, and to cause the engine to function in a positive, efficient, and highly satisfactory manner.

Another object of the invention resides in constructing the engine of a minimum number of parts and so as to develop a maximum amount of power for a given weight of engine.

A still further object of the invention resides in providing a cylinder with a piston movable therein and in further providing a compressor together with a compressed air chamber connected with said cylinder.

Another object of the invention resides in providing a fuel mixture chamber connected with said compressed air chamber and in further providing said cylinder with an exhaust port, a compressed air port and a port for fuel mixture, said ports being respectively connected with the exterior, the compressed air chamber and the chamber for fuel mixture.

Another object of the invention resides in providing passageways in said piston whereby said ports are successively opened in the order named at the end of the impulse stroke of the engine so as to successively exhaust, admit compressed air into the cylinder and charge the cylinder with fuel mixture.

A still further object of the invention resides in forming said compressor as an auxiliary cylinder and piston coaxially disposed relative to said first cylinder, said compressor piston being connected to said impulse piston and operated therethrough.

A feature of the invention resides in providing said cylinders and compressors in pairs and in connecting said cylinders and compressors to said compressed air and fuel mixture chambers in a manner such that the compressor associated with one impulse cylinder furnishes compressed air and fuel mixture for the other impulse cylinder and so that the compressor associated with the other impulse cylinder furnishes air and fuel mixture for the first impulse cylinder.

An object of the invention resides in providing a passageway between said compressed air chamber and fuel mixture chamber and in disposing a fuel jet in said passageway to carburet the air passing from said compressed air chamber through said passageway and into said fuel mixture chamber.

A feature of the invention resides in providing a passageway in the impulse cylinder of the engine adapted to bring the compressed air cylinder into communication with the compressed air chamber for directing compressed air therein.

Other objects of the invention reside in the details of construction thereof and in the novel combination and arrangement of parts hereinafter illustrated or described.

In the drawings:

Fig. 2 is a plan sectional view of the engine shown in Fig. 1 taken on line 2—2 of Fig. 1 and Fig. 5 and drawn to a slightly smaller scale.

Fig. 3 is a view similar to Fig. 2 taken on line 3—3 of Fig. 1 and Fig. 4.

Fig. 4 is a vertical sectional view of the engine taken on line 4—4 of Fig. 3.

Fig. 5 is a view similar to Fig. 4 taken on line 5—5 of Fig. 2.

Fig. 6 is a plan sectional view similar to Fig. 3 and taken on line 6—6 of Fig. 4.

Fig. 7 is a fragmentary sectional view taken on line 7—7 of Fig. 2.

Figure 1:
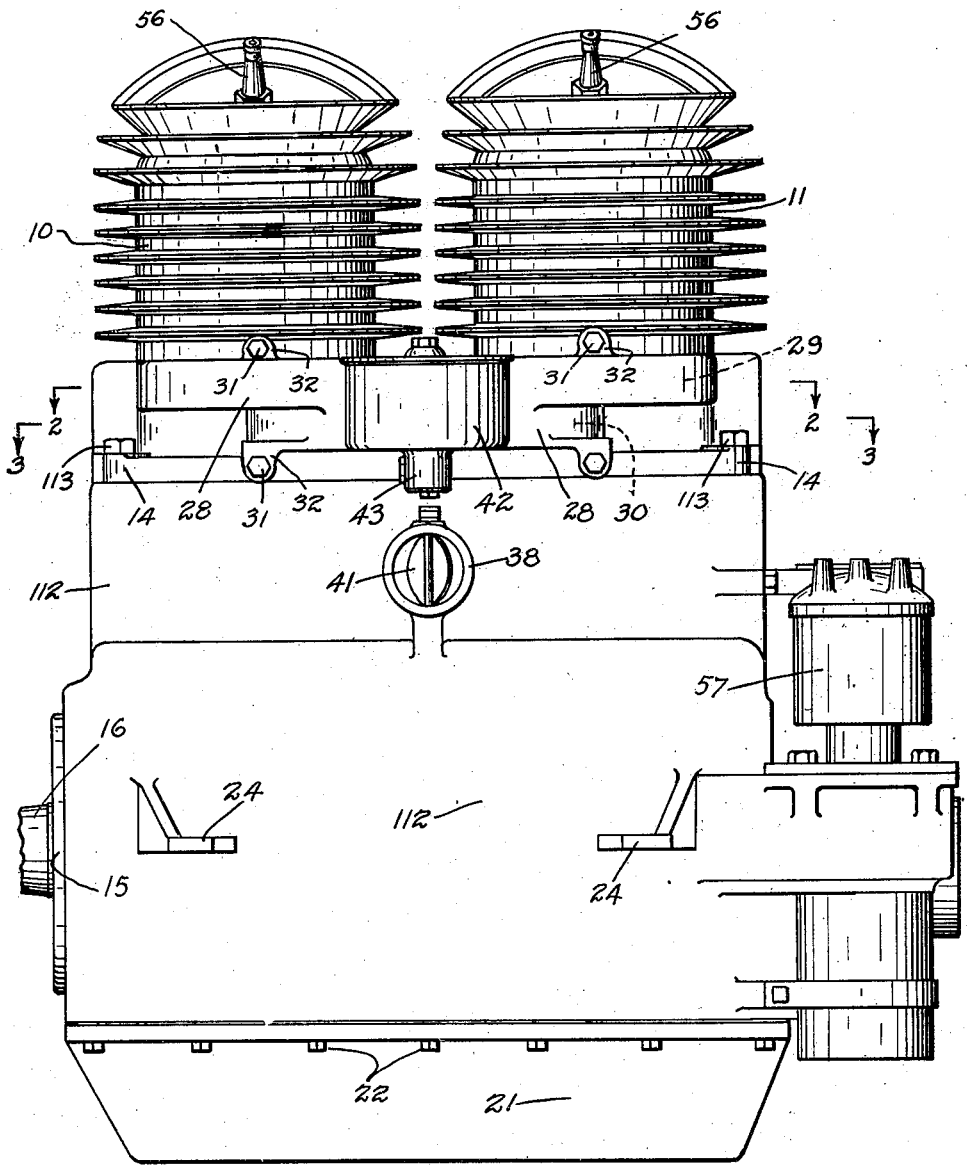
Fig. 1 is a side elevational view of an internal combustion engine illustrating an embodiment of our invention.

Figs. 8 to 19 inclusive are diagrammatic longitudinal sectional views of an engine constructed in accordance with our invention and illustrating the relative positions of the parts throughout the cycle of operation of the engine.

In our improved internal combustion engine, the cylinders are constructed in pairs, each pair including an impulse cylinder and a compressor cylinder, and the compressor cylinder of one pair operates in conjunction with the impulse cylinder of the other pair, and vice versa. All of the cylinders are identical in construction and any number of pairs of cylinders may be used. For this reason, we have shown in the drawings, an engine with two impulse cylinders indicated at 10 and 11. These cylinders are mounted upon a crank case 112, as shown in Figs. 1 and 4, and are attached thereto by means of cap screws 113 which extend through ears 14 formed on said cylinders and are screwed into the crank case proper. At the ends of the crank case 112 are provided bearings 15 in which is journalled the usual crank shaft 16 which is provided with two crank arms 17 disposed 180° apart. Within the two cylinders 10 and 11 are mounted pistons 18 which are provided with wrist pins 19. Connecting rods 20 are journalled on the cranks 17 and are connected to the wrist pins 19 and serve to transform the reciprocating impulse of the pistons 18 into rotary movement in the same manner as with the ordinary internal combustion engine. An oil pan 21 is detachably secured to the bottom of the crank case 12 by means of cap screws 22 and serves to fully enclose the engine and to form an oil reservoir serving the usual purpose. The engine may be supported on lugs 24 issuing outwardly from the crank case 112 or may be supported in any other desired manner.

In conjunction with the impulse cylinders 10 and 11, two compressor cylinders 25 and 26 are employed which are concentrically arranged with respect to the cylinders 10 and 11, and which are formed in the crank case 112 immediately below the said cylinders 10 and 11. These cylinders are considerably larger than the cylinders 10 and 11 so that the displacement of the said compressor cylinders is considerably greater than the displacement of the impulse cylinders. At the lower ends of the pistons 18 are provided auxiliary pistons 27 of a diameter corresponding with the diameter of the cylinders 25 and 26 which are formed by enlarging the ends of said pistons, as best shown in Fig. 4. Both the pistons 18 and 27 may be provided with suitable piston rings for effecting a seal between the walls of the cylinders in which the same operate as in usual engine construction and being integrally connected together operate simultaneously in a manner to be presently described.

In conjunction with the two sets of cylinders, we employ a double manifold 28 having an upper chamber 29 and a lower chamber 30. This manifold is adapted to be clamped to the cylinders 10 and 11 by means of cap screws 31 which pass through ears 32 formed on said manifold and which are screwed into the walls of the said cylinders. In said cylinders are provided ports 33 and 34 which communicate with the upper chamber 29 of manifold 28. These ports are positioned slightly above the upper surface 35 of the said pistons when in their lowermost position, as shown in Fig. 5. In addition to the ports 33 and 34, the cylinders 10 and 11 are provided with ports 36 and 37 which communicate with the lower chamber 30 of the manifold 28. These ports are preferably arranged at different circumferential positions with respect to the ports 33 and 34 in the cylinder for a purpose to be presently described so that independent communication may be had between said chambers and the cylinders 10 and 11. Immediately below these ports are arranged ports 136 and 137 which communicate with said ports and which are separated therefrom by means of a divider 52 so as to provide two sets of ports communicating with compressed air chamber 30.

In addition to the ports 33, 34, 36 and 37, the cylinders 10 and 11 are further formed with exhaust ports 53 which are positioned slightly above the ports 33, 34, 36 and 37. These exhaust ports may be connected by an exhaust manifold 54 in the usual manner so as to lead the burned gases away from the engine.

In conjunction with the cylinders 25 and 26, we provide a manifold 38 which is integrally constructed in the crank case 112, as best shown in Fig. 6, and which is connected with two ports 39 and 40 formed in the said cylinders 25 and 26 and entering the same slightly above the lowermost position of the pistons 27 within said cylinders. The air drawn into the two compressors enters the cylinders 25 and 26 through the said manifold which may be controlled through a butterfly valve 41 disposed at the outer end of the same.

The carburetor used in conjunction with our invention is best shown in Figs. 2, 4 and 7. This device includes a chamber 42 which is connected with a fuel outlet 43 extending outwardly therefrom. A jet 44 issuing upwardly from this fuel outlet is adapted to extend through the lower wall 45 of the manifold 28 and is attached thereto by means of bolts 46 in the customary manner. This jet extends up toward the partition 47 which divides the manifold 28 into the upper and lower chambers 29 and 30 respectively and through an opening 48 in said partition so as to carburet the air from the chamber 30 in its passage into the chamber 29. The fuel in the chamber 42 is brought under pressure by any suitable means so as to force the fuel through the jet 44 and into the compressed air in the manifold.

The pistons 18 are constructed with deflectors 49 which extend upwardly therefrom and serve to direct the gas entering the cylinders 10 and 11 upwardly and along the walls of the said cylinders in a manner customary with two cycle internal combustion engines. The said pistons are further constructed with passageways 50 at the upper portions of the same which, when the said pistons are near the lowermost ends of their strokes prior to the uncovering of the ports 33 and 34, are in communication with the ports 136 and 137 so as to permit of the passage of air from the chamber 30 and into the said cylinders to scavenge the same. In addition to these passageways, the said pistons are constructed with passageways 51 at the lowermost portions thereof which are adapted to bring the cylinders 25 and 26 in communication with the ports 136 and 137 which lead to the chamber 30 of manifold 28.

For igniting the fuel mixture within the impulse cylinders of the engine, the same are provided with spark plugs 55 and 56. These spark plugs 55 and 56 may be connected to any suitable ignition system such as is now in common use. For certain types of our improved engine, we prefer a dual system of ignition, each of the spark plugs 55 and 56 being connected to its respective ignition device. In the drawings, one of the timers of such a system is indicated at 57, which may be mounted upon the crank case 112 and driven in the usual manner from the crank shaft 16. Such construction, being old in the art and not forming a particular feature of this invention, is not described in detail.

The operation of the engine may best be understood by referring to Figs. 8 to 19 inclusive, which illustrate the various parts of the engine in diagrammatic form. Figs. 8 to 13 inclusive refer to the cylinders 10 and 25, while Figs. 14 to 19 inclusive refer to cylinders 11 and 26. It is to be noted that the superimposed figures represent the corresponding positions of the pistons within the two sets of cylinders for the various port openings and closings now to be described. Commencing with Fig. 8 and following through the various figures, the operation of the engine can be traced as follows: Assuming the piston 18 of cylinder 10 in its uppermost position as shown in Fig. 8, and the cylinder 10 charged with a charge of compressed fuel mixture, the corresponding position of piston 18 of cylinder 11 would be at its lowermost position and the corresponding piston 27 of cylinder 26 at its corresponding lowermost position. At such position, the port 40 leading to cylinder 26 is open to the atmosphere so as to bring the said cylinder 26 under atmospheric pressure and to fill the same with air. As the crank shaft 16 rotates, in the direction indicated by the arrow in Fig. 8, the fuel mixture within the chamber 10 is ignited at the proper time and the piston 18 of said cylinder travels downwardly through its impulse stroke. When the piston 27 of cylinder 25 reaches a position shown in Fig. 9, the port 39 leading to cylinder 25 is uncovered permitting air to enter into the cylinder 25 through the manifold 38. At the same time, the pistons 18 and 27 of cylinders 11 and 26 are traveling upwardly and the air within cylinder 26 is being compressed. When the piston 18 of cylinder 10 reaches the position shown in Fig. 10, the exhaust port 53 is uncovered which permits the exhaust to escape through manifold 54 and the pressure within and without cylinder 10 to be equalized. At the same time, piston 18 of cylinder 11 is traveling upwardly and has reached a position whereby the passageway 51 of said cylinder is in communication with the port 137 of cylinder 11. This permits the compressed air within cylinder 26 to pass through the said passageway and port and enter the lower chamber 30 of the manifold 28. As the piston 18 of cylinder 10 moves slightly downwardly the opening of the exhaust port 53 increases and the passageway 50 of said cylinder is brought into communication with the port 36, which permits compressed air from chamber 30 to enter said port and flow upwardly along the deflector 49 and along the inner walls of the cylinder 10 and out through the exhaust port 53 as shown by the arrows in Fig. 11. At the same time, the passageway 51 of piston 18 of cylinder 11 is in communication with the port 137 and the piston 27 of cylinder 28 in traveling upwardly is compressing the air within said cylinder and maintaining the pressure within chamber 30. The size of the passageway 50 in the upper portion of port 36 is such as to admit but a small quantity of air into the impulse cylinder which is just sufficient to scavenge the burned gases from the impulse cylinder and force the same through the exhaust port. It is to be noted that, due to the difference in circumferential position of the ports 33, 136 and 36 and the ports 34, 137 and 37 of the two cylinders that the passageway 50 can at no time come into communication with the ports 33 and 34 so that discharge from the chamber 29 through said passageway is precluded. As the piston 18 of cylinder 10 travels further downwardly, the passageway 50 becomes covered by the divider 52 between ports 36 and 136 and the passage of air into the cylinder terminates. At its lowermost position, as shown in Fig. 12, port 33 of cylinder 10 becames uncovered through the upper surface 35 of the piston 18 of said cylinder, which permits the remaining compressed air within the chamber 30 and in the compression cylinder to pass through the opening 48 in partition 47 to carburet the fuel from the jet 44 and to force the same through chamber 29 and into the cylinder proper. During such movement, the piston 27 of cylinder 26 has been traveling upwardly and maintaining the pressure within chamber 30, which movement takes place until the said cylinder reaches its uppermost position, as shown in Fig. 18. This leaves the cylinder 10 completely filled with fresh fuel mixture and the pressure within both chambers 29 and 30 in the said cylinder equalized. Further rotary movement of the crank shaft 18 in the direction indicated by the arrows in Fig. 13 causes the fuel mixture within the cylinder 10 to be compressed prior to the explosion thereof when the piston 18 of the said cylinder reaches its uppermost position as shown in Fig. 8. During the upstroke of the piston 18 of cylinder 10, the air trapped within the cylinder 25 is being compressed and forced into chamber 30 where the same is led into the cylinder 11 in exactly the same manner as the air compressed in cylinder 26 was forced into cylinder 10. A position of the piston 18 during such movement is shown in Fig. 13. The cycle of operation then continues for cylinder 11, the same as cylinder 10, cylinder 25 compressing the air and scavenging and carbureting within cylinder 11 as before described. It is to be noted that with our invention the two cylinders operate conjointly so that the compressor cylinder of the one set of cylinders functions in conjunction with the impulse cylinder of the other set of cylinders.

The invention is highly advantageous in that a positive and efficient two cycle engine is provided. Due to the thorough scavenging of the cylinders, far greater power and efficiency is procured than is otherwise possible with a given piston displacement. Due to the concentric arrangement of the compressor and impulse cylinders, a relatively long piston stroke may be employed whereby the full benefit may be secured from the explosion of the fuel mixture. In the particular arrangement of parts the compressed air passes first around the exterior of the impulse piston and then during scavenging along the interior of the impulse cylinder so as to thoroughly cool both parts, thereby eliminating the necessity of water cooling or auxiliary air cooling as by fans and similar devices. By the elimination of valves and other moving parts, and by the utilization of the two cycle principle, an extremely light and rugged engine may be constructed which is particularly adaptable for use in air craft and similar installations where economy of weight is important. In injecting the air into the cylinder prior to the charging of the same with the fuel mixture, any remaining trace of unburned gas within the impulse cylinder is insulated from the fresh charge of fuel mixture so as to entirely eliminate the possibility of preignition and the ensuing evils, such as loss of power, overheating and injury to the motor proper. A thorough scavenging of the cylinder, as with our invention, greatly assists in promoting flame propagation and also in reducing the residual carbon deposits resulting from the combustion. Our improved engine has practically all of the advantages of both the two cycle and the four cycle engines without any of the disadvantages of either of said types of engines now common thereto.

In the drawings, we have shown ports adapted to be covered by the pistons of the compressor and impulse cylinders for bringing said cylinders into communication with one another. It can be readily comprehended however, that valves of any nature may be used for this purpose and in the claims we have used the word valve in its broadest sense to include any type of valve suitable for the purpose.

Changes in the specific form of our invention, as herein described, may be made within the scope of what is claimed without departing from the spirit of our invention.

Having described our invention, what we claim as new and desire to protect by Letters Patent is:

1. An internal combustion engine comprising a cylinder, a piston movable therein, a compressor, an air charging chamber, a gas charging chamber, a passageway between said chambers, a fuel jet positioned in said passageway, means for connecting said compressor with said air charging chamber, and valves for connecting said air charging and fuel charging chamber with said cylinder, said valves being adapted to open in the order named during the impulse stroke of said piston.

2. An internal combustion engine comprising a cylinder, a piston movable therein, an exhaust port on one side of said cylinder, a fuel mixture intake port on the opposite side of said cylinder positioned below said exhaust port, an air intake port positioned below said fuel mixture port and at another portion of said cylinder distinct from said exhaust and fuel mixture ports, said exhaust port being adapted to be first uncovered by the piston upon the approach of said piston toward the end of its impulse stroke, a passageway in said piston for thereafter and while the exhaust port is uncovered bringing said compressed air port into communication with said cylinder, to scavenge the burned gases within said cylinder, said air port being adapted to be covered and said fuel mixture port uncovered during the final movement of said piston in its impulse stroke to charge said cylinder with fuel mixture, means for carbureting the air passing through said fuel mixture port, and means for forcing air through said compressed air port.

3. An internal combustion engine comprising a cylinder, a piston movable therein, a second cylinder, a second piston movable therein and connected to said first piston, a compressed air chamber, a port in said cylinder communicating with said compressed air chamber, a passageway in said piston for bringing said port into communication with one of said cylinders, and another port in said piston for bringing said port into communication with the other of said cylinders.

4. An internal combustion engine comprising a cylinder, a piston movable therein, said cylinder having two ports near one end thereof for the admission of air and fuel to the cylinder, said air port being nearest the end of the cylinder at which the ports are located and said fuel port being farthest therefrom, and means formed in said piston for covering and uncovering said air and fuel ports, said air port being uncovered thereby before said fuel port during the travel of the piston toward the end thereof at which said ports are situated.

5. An internal combustion engine comprising a cylinder, a piston movable therein, said cylinder having two ports near one end thereof for the admission of air and fuel to the cylinder, said air port being nearest the end of the cylinder at which the ports are located and said fuel port being farthest therefrom, said piston having a passageway therein communicating with said cylinder and with a port in the wall of said piston disposed below the edge of said piston, the upper edge of said piston uncovering the fuel port, said piston above the piston port serving to cover the air port in said cylinder upon the uncovering of said cylinder fuel port.

6. An internal combustion engine comprising a cylinder, a piston movable therein, said cylinder having two ports near one end thereof for the admission of air and fuel to the cylinder, said air port being nearest the end of the cylinder at which the ports are located and said fuel port being farthest therefrom, means formed in said piston for covering and uncovering said fuel and air ports, said air port being uncovered before said fuel port during the travel of the piston toward the end thereof at which said ports are situated, and means for covering said air port during the uncovering of said fuel port.

7. An internal combustion engine comprising an impulse cylinder, a piston movable therein, a compressor cylinder, a piston movable therein, means forming two passageways disposed adjacent one another, one of said passageways being in communication with both of said cylinders, and the other of said passageways being in communication with said impulse cylinders and with said first named passageway, and means for delivering fuel into said second named passageway.

8. An internal combustion engine comprising a cylinder, a piston movable therein, a compressor, means forming two passageways, one of said passageways being connected to said cylinder and to said compressor, and the other of said passageways being connected to said cylinder only, said passageways being separated by a single wall, an opening in said wall for bringing said passageways into communication with one another, and a fuel jet disposed in said opening.

9. An internal combustion engine comprising a pair of impulse cylinders, pistons movable therein, a pair of air compressing cylinders, piston movable therein, one of the pistons of said impulse cylinders being connected to one of the pistons of said air compressing cylinders and the other of the pistons of said impulse cylinders being connected to the other of the pistons of said air compressing cylinders, ports in said cylinders, and a manifold having passageways communicating with said ports for bringing said cylinders into communication with one another.

10. An internal combustion engine comprising a pair of impulse cylinders, pistons movable therein, a pair of air compressing cylinders, pistons movable therein, one of the pistons of said impulse cylinders being connected to one of the pistons of said air compressing cylinders and the other of the pistons of said impulse cylinders being connected to the other of the pistons of said air compressing cylinders, two ports in each of said impulse cylinders, a manifold having two passageways connected to said cylinders, each of said passageways bringing each of the corresponding ports of said cylinders into communication with one another, said passageways being connected to one another, and means for bringing said compressing cylinders into communication with one of said passageways.

11. An internal combustion engine comprising an impulse cylinder, a piston movable therein, an air compressing cylinder, a piston movable therein, said piston traveling 180° out of phase with one another, means forming a passageway between said cylinders, means for bringing said compressed air cylinder into communication with said impulse cylinder through said passageway during the latter portion of the impulse stroke of said impulse piston, said compressed air cylinder discharging directly into said impulse cylinder through said passageway during such portion of the stroke of said impulse piston.

In testimony whereof we have affixed our signatures to this specification.

JULIAN P. FARNAM.
EDWARD R. STONE.